United States Patent [19]
Suzuki et al.

[11] Patent Number: 5,642,215
[45] Date of Patent: Jun. 24, 1997

[54] OPTICAL TRANSMISSION SYSTEM

[75] Inventors: Masatoshi Suzuki, Kawajima-machi; Itsuro Morita, Ichigayatamachi; Noboru Edagawa, Tokyo; Hidenori Taga, Sakado; Shu Yamamoto, Shiki; Shigeyuki Akiba, Tokyo, all of Japan

[73] Assignee: Kokusai Denshin Denwa Kabushiki Kaisha, Tokyo, Japan

[21] Appl. No.: 521,952

[22] Filed: Aug. 31, 1995

[30] Foreign Application Priority Data

Sep. 12, 1994 [JP] Japan .................. 6-242403

[51] Int. Cl.$^6$ .................. H04B 10/00
[52] U.S. Cl. .................. 359/161; 359/179; 359/341
[58] Field of Search .................. 359/161, 173, 359/174, 176, 179, 180, 181, 341, 344

[56] References Cited

U.S. PATENT DOCUMENTS

| | | | |
|---|---|---|---|
| 5,473,458 | 12/1995 | Mamyshev et al. | 359/161 |
| 5,521,738 | 5/1996 | Froberg et al. | 359/184 |
| 5,523,874 | 6/1996 | Epworth | 359/161 |

OTHER PUBLICATIONS

Mollenauer et al, Demonstration of Error–Free Soliton Transmission at 2.5 Gbit/s Over More Than 14000 km, Electronic Letters Oct. 24,1991 vol. 22 pp. 2055–2056.

Yamada et al, 10 Gbit/s Single–Pass Soliton Transmission Over 1000km, Electronics Letters Jul. 4,1991 vol. 27 No. 14 pp. 1289–1291.

Suzuki et al, Feasibility Demonstration of 20 Gbit/s Single Channel Soliton Transmission Over 11500km Using Alternating–Amplitude Solitons, Electronics Letters Jun. 23,1994 vol. 30 No. 13 pp. 1083–1084.

Kodama et al, Generation of Asymptotically Stable Optical Solitions and Suppression of the Gordon–Haus Effect, Optics Letters, vol. 17 No. 1 Jan. 1,1992 pp. 31–33.

*Primary Examiner*—Wellington Chin
*Assistant Examiner*—Rafael Barares
*Attorney, Agent, or Firm*—Emmanuel J. Lobato; Burns & Lobato, P.C.

[57] ABSTRACT

An optical transmission system which permits long-distance, ultrafast, high-capacity optical soliton transmission by suppressing timing jitter with simple means. In an optical transmission system which uses a transmission line composed of an optical fiber for transmitting therethrough a lightwave signal having digital information added to a return-to-zero lightwave pulse and a plurality of optical amplifying repeaters for compensating for losses by the optical fiber and in which the pulse compression effect by the nonlinear optical effect on the optical pulse and the pulse expansion effect by the dispersion effect are compensated, at least one optical band limited element which has a flat group delay characteristic near the center frequency is disposed in the transmission line at intervals of a period Z equal to the soliton period $Z_{sol}$ and the product, $aB_{sol}^2$, of the curvature a of the product of the intensity transfer funtions of the optical band limited elements in the vicinity of the center frequency in the soliton period and the square of the full width at half maximum, $B_{sol}$, of the spectrum of the lightwave pulse to be transmitted is set to a value in the range of $2.1 \times 10^{-2}$ to $8.3 \times 10^{-2}$.

6 Claims, 4 Drawing Sheets

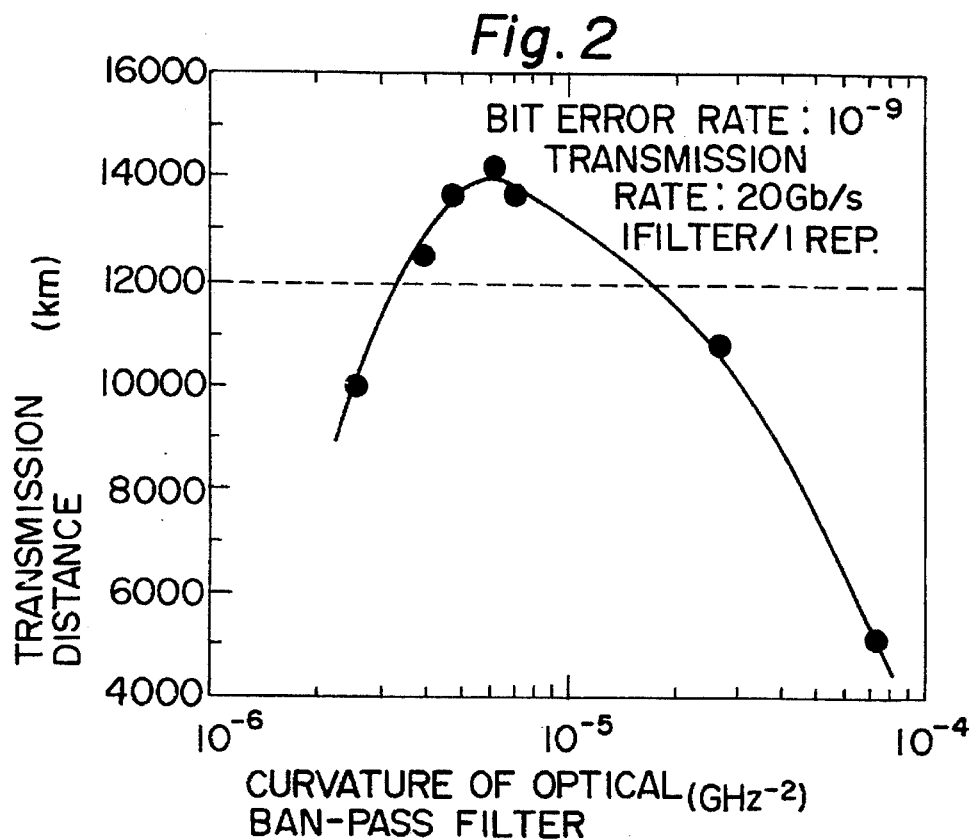
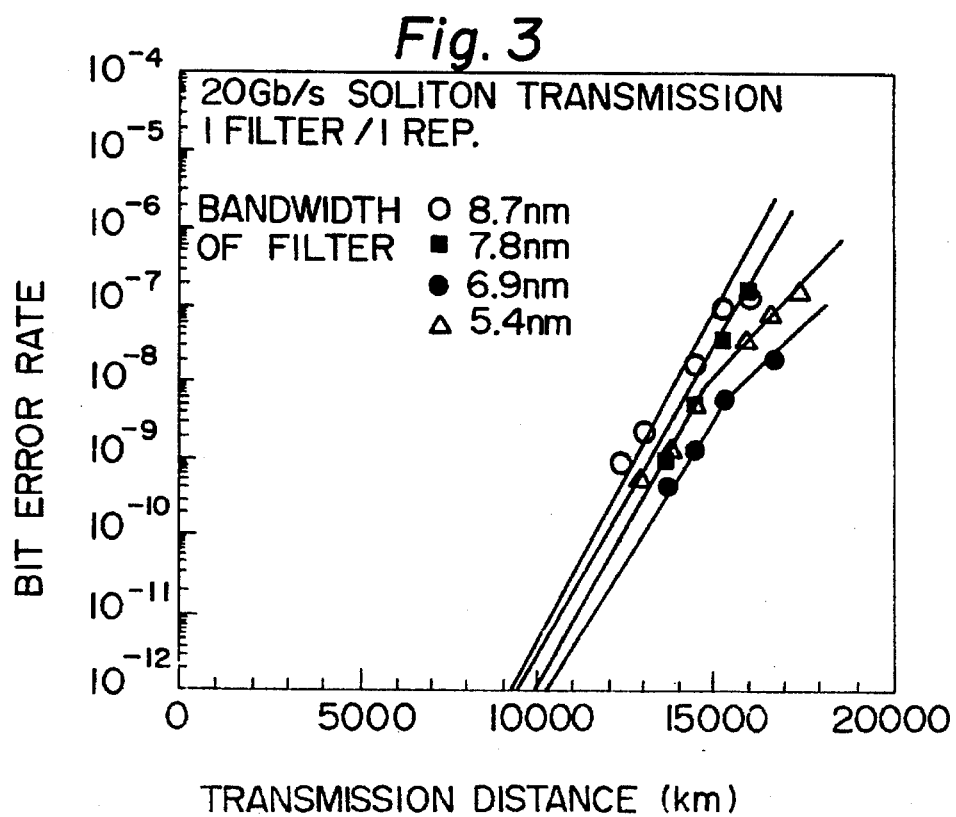

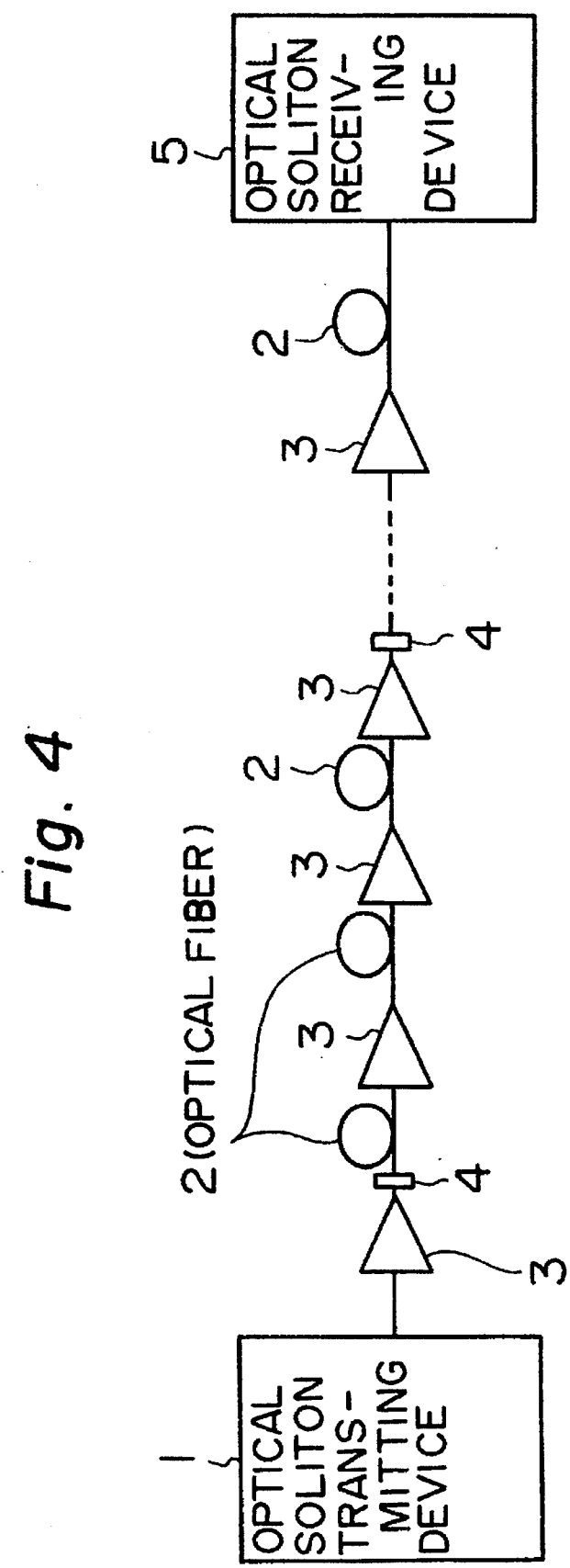

OPTICAL TRANSMISSION SYSTEM

BACKGROUND OF THE INVENTION

The present invention relates to a transmission system using optical fibers and, more particularly, to a long-distance, large-capacity optical transmission system employing return-to-zero lightwave pulses, such as soliton lightwave pulses, and optical amplifiers.

Buttressed by developments of optical amplifying techniques, optical fiber communication technology has made rapid-paced progress toward ultra-long-distance communication, now allowing implementation of a trans-pacific communication system without the need of using regenerative repeaters. At increased transmission rate, however, conventional transmission systems suffer serious degradation of their transmission characteristices that are caused by the wavelength dispersion characteristic and nonlinear effect of optical fibers, imposing severe limitations on the realization of a high-speed, high-capacity transmission system.

In recent years, an optical soliton communication system has been in the limelight as a system will break the bottle-neck in the speedup of transmission by the wavelength dispersion characteristic and the nonlinear effect.

The optical soliton communication system is a system that positively utilizes the wavelength dispersion characteristic and nonlinear effect of optical fibers which are major factors to the degradation of characteristics of the conventional transmission systems and that transmits optical short pulses intact by balancing optical pulse width expansion owing to the wavelength dispersion by the optical fibers and pulse width compression based on the nonlinear effect.

It is in the last several years in which an erbium-doped optical fiber amplifier (EDFA) has emerged as a practical optical amplifier that the long-distance optical soliton communication system has attracted attention as a communication system which has the potential for dramatically increasing the transmission capacity of the optical transmission system. The soliton lightwave pulse, which stably propagates without changing its shape and level, is based on the assumption that it is free from losses of the transmission medium. However, ordinary optical fibers produce losses, and the light intensity becomes attenuated with distance, resulting in the nonliner optical effect being lessened and becoming unbalanced with the dispersion effect. To realize fiber-optic transmission with apparently no loss while keeping the light intensity at a certain value, it is therefore necessary that losses of optical fibers be compensated for by optical amplifiers. In the case of using optical amplifiers as repeaters, it is possible to accomplish soliton communication with practically no waveform variations of lightwave pulses like ideal soliton pulses, by setting the average power between repeaters and the average dispersion of optical fibers to soliton conditions. In the optical soliton communication, optical amplifier noise affects the timing jitter of lightwave pulses at the receiving end and eventually deteriorates the transmission characteristic. That is to say, soliton lightwave pulses with noise superimposed thereon undergo random fluctuations of their light intensity and slightly shift in shape from ideal soliton lightwave pulse, causing fluctuations in the shift amount of the carrier frequency by the nonlinear optical effect. Since this is repeated for each repeater, the time of arrival of lightwave pulses randomly fluctuates during their propagation in optical fibers each having a limited dispersion value, incurring the timing jitter at the receiving end. This phenomenon is called as the Gordon-Haus effect, which is a major limiting factor to the transission characteristic of the optical soliton communication.

There have been intensitively studied soliton control techniques for suppressing the above-mentioned timing jitter, and soliton transmission experiments have made rapid progress in the last few years. One possible method that has been proposed to suppress the timing jitter is to derectly suppress it in the time domain by inserting in the transmission line optical modulators synchronized with transmission signals. This method necessitates, however, the provision of a fast optical modulator and its driver in each optical repeater. This imposes some limitations on ultrafast transmission and makes it difficult to apply this method to submarine cables which are required to be highly reliable. Another method is to insert optical filters in the transmission line to control the random frequency shift in the frequency domain. This method, however, involves the use of optical repeaters each having a fast optical modulator and a driver therefor, and hence poses limitations on the realization of an ultrafast transmission system; besides, this method is difficult to apply to submarine cables which are required to be highly reliable. Another method is to insert optical filters in the transmission line to control the random frequency shift in the frequency domain. This method is easy of use for the speedup of transmission, since the repeater needs only to have an optical filter which is a passive element.

The optical filter itself had already been used in experiments on the soliton transmission (E. Yamada, K. Suzuki, and M. Nakazawa, Electronics Letters, Vol. 27, No. 14, pp. 1289–1291, 4th Jul. 1991), subsequently, it was reported that an optical band-pass filter has the effect of suppressing the timing jitter by bringing close to its center frequency the signal frequency with random shift which is the cause of the timing jitter (A. Mecozzi, et al., Optics Letters, Vol. 16, pp. 1841–1843, December 1991, and Y. Kodama and A. Hasegawa, Optics Lettes, Vol. 17, pp. 31–33, January 1992, and Japanese Pat. Laid-Open No. 227105/93).

This filter is commonly referred to as a frequency guiding filter since it guides in the frequency domain the soliton lightwave pulses which tend to deviate from its center frequency.

Conventionally, there has been used a narrow-band filter of a band about 10 times the full width at half maximum $B_{sol}$ of the soliton spectrum with a view to effectively suppressing the timing jitter (L. F. Mollenauer et al., Electronics Letters, Vol. 27, No. 22, pp. 2055–2056, 24th Oct. 1991, and L. F. Mollenauer et al., Electronics Letters, Vol. 28, No. 8, pp. 792–794, 9th Apr. 1992). The narrower the full width at half maximum of the band is, the more the guiding effect increases, but the narrow-band filter cuts the lower portion of the soliton spectrum; it is reported that the compensation for the cut portion would apparently give rise to an excessive amplification of a non-soliton component in the vicinity of the center frequency of the filter, making soliton pulses to be unstable. For this reason, it has been considered preferable that the band of the optical filter be around 10 times the full width at half maximum of the soliton spectrum. With such a conventional frequency guiding filter, however, the timing jitter can be suppressed only to a limited extent; in a transpacific communication system using one wavelength (about 9000 km long), the transmission rate is approximately 7.5 Gb/s at maximum and cannot be increased up to 10 Gb/s (L. F. Mollenauer et al., Electronics Letters, Vol. 28, No. 8, pp. 792–794, 9th Apr. 1992).

FIG. 6 shows the results of tests made by the inventors of this application at a transmission rate of 20 Gb/s. In FIG. 6 the ordinate represents the bit error rate and the abscissa the distance of transmission. The bit error rate for a transmission distance 4500 km was $10^{-12}$ and a 9000 km transmission was quite impossible.

To solve this problem, there has also been studied a method of slightly sliding the center frequency of the optical filter with distance, and the filter is called a sliding-frequency guiding filter. The soliton component, which is a nonlinear wave that propagates while making a frequency chirp, follows even slight variation in the center frequency of the filter, but a noise component which is a linear wave does not follow the frequency shift of the filter and is gradually driven out of the band of the filter, with the result that the accumulation of noise is suppressed. The shift amount of the center frequency is about 6 to 7 GHz for 1000 km. There have been conducted experiments on a 10 Gb/s two-wavelength multiplex transmission using the sliding-frequency guiding filter; it has been reported that the use of such a filter would permit transmission for more than 9000 km (L. L. Mollenauer et al., Electronics Letters, Vol. 29, No. 10, pp. 910–911, 13th May 1993).

It is extremely difficult, however, to apply such narrow-band optical filters to actual systems. The frequency of light is approximately 200 THz; for example, in the case of the sliding-frequency guiding filter, the absolute value of its center frequency needs to be shifted around 200 MHz (accuracy of 0.0001% with respect to the center frequency) for each of repeaters installed at intervals of about 30 km. From the viewpoints of the existing technical level and such an environment change as a temperature change of the actual system, it is expected that such precise control of the narrow-band optical filter is almost impossible in the actual system. Taking into account the application of the optical soliton communication to the optical submarine cable, the prior art which involves the use of an ultra-narrow band optical filter in the repeater required to be of high reliability is not desirable from the practical viewpoint such as the long-term reliability of the system.

As described above, it is known in the art that a high-capacity, long-distance optical communication system using the narrow-band filter could be constructed through utilization of the sliding-frequency guiding filter scheme, but as regards optical band-pass filters which is free from the frequency sliding requirement and has a relatively large full width at half maximum of the band, there has been reported only an experiment using a second-order Butterworth filter (M. Suzuki et al., Electronics Letters, Vol. 30, pp. 1083–1084, 23rd Jun. 1995). Since the second-order Butterworth optical filter has a maximum flat amplitude characteristic, its amplitude characteristic is relatively flat and the problem of an excessive gain for linear waves near the center frequency is difficult to arise, but since its group delay characteristic is not flat, the soliton time-waveform is modified. This poses a problem that the full width at half maximum of the band of the filter which can be used in practice is limited to a very narrow range.

As will be appreciated from the above, the conventional optical band-pass filters which suppress the timing jitter have disadvantages such as poor jitter suppressing ability and difficulty in their precise control.

SUMMARY OF THE INVENTION

An object of the present invention is to provide an optical transmission system which permits ultrafast, large-capacity optical transmission for long distances by suppressing timing jitter with simple means.

The present invention is directed to an optical transmission system, which is composed of an optical fiber for transmitting lightwave signals with digital information loaded to return-to-zero lightwave pulses and a plurality of optical amplifying repeaters disposed on the optical fiber at intervals of a distance $Z_{amp}$ to compensate for losses of the optical fiber and in which a mean value of wavelength dispersion in a transmission line formed by the optical fiber and the optical amplifying repeater and the output light intensity of each optical amplifying repeater are established such that a pulse compression effect by a nonlinear optical effect on the lightwave pulses and a pulse expansion effect by the dispersion effect are mutually compensated for and in which, being provided $$Z = 0.322 \frac{\pi^2 C}{\lambda^2} \frac{\tau^2}{D}$$

(where D: mean value of wavelength dispersion of the fiber

λ: wavelength of the lightwave signal

C: light velocity in a vacuum

τ: full width at half maximum of a time-waveform of the lightwave signal)

at least one optical band limited element which has a flat group delay characteristic in the vicinity of a center frequency thereof are provided in the transmission line for each period Z, and the product, $aB_{sol}^2$, of a curvature a of a product of the intensity transfer functions of the optical band limited element near the center frequency in the period Z and a square of the full width at half maximum, $B_{sol}$, of the spectrum of the lightwave pulses to be transmitted falls within a range of $2.1 \times 10^{-2}$ to $8.3 \times 10^{-2}$.

That is to say, according to the present invention, with a view to suppressing the timing jitter, optical band limited elements whose full width at half maximum of the band is large enough to keep the spectra of lightwave pulses substantially unchanged are inserted in the optical transmission line to suppress the excessive gain for the linear wave in the neighborhood of the filter center frequency, and the transfer function of the optical band limited element is established to a first-order function which makes it difficult to introduce modification of the time-waveform, or a high-order function which has the maximum flat delay characteristic; and besides, the value of the curvature near the center frequency of the optical band limited element relative to the full width at half maximum of the spectrum of the lightwave pulse or the full width at half maximum of the spectrum of the lightwave pulse or the full width at half maximum of the band of the element is established in a prescribed range. Thus, the random frequency shift of the lightwave pulses is effectively guided in the frequency domain to suppress the timing jitter. This permits the realization of a long-distance, high-capacity optical communication system.

Incidentally, the present invention is not limited specifically to the optical soliton transmission system in a narrow sense in which the lightwave pulse waveform and width and the optical repeater output are defined by soliton conditions. In a fiber-optic transmission which has the nonlinear characteristic, if the lightwave pulse waveform is not extremely out of the $sech^2$ type of the soliton lightwave and the optical amplifying repeater output is established to a little large value, then lightwave pulses converge to the soliton lightwave during transmission. Hence, the optical transmission system according to the present invention is an optical soliton transmission system in a wide sense which includes a transmission system which converges RZ lightwave pulses to the soliton lightwaves during transmission.

As the results of studies made by the inventors of this application in view of the shortcomings of the prior art, it has been found that the optical filter necessary for the realization of a long-distance optical communication system in the transpacific class which has a large capacity in the 20 Gb/s needs to possess such characteristics as listed below.

1) To suppress the excessive gain for the linear wave in the vicinity of the center frequency of the filter through the use of a band limited element whose full width at half maximum of the band is large enough to keep spectra of lightwave pulses substantially unchanged.

2) To select the transfer function of the optical filter so that the group delay characteristic becomes substantially flat in the band to prevent modification of the time waveform.

3) To effectively guide the random frequency shift of lightwave pulses in the frequency domain to suppress timing jitter, by establishing within a prescribed range the value of the curvature in the vicinity of the center frequency of the band limited element relative to the full width at half maximum of the lightwave pulse spectrum or the value of the full width at half maximum of the band to the latter.

The present invention materializes a high-capacity, long-distance optical transmission system which suppresses timing jitter through the use of an optical filter of the first-order transfer function which is large in the full width at half maximum of the band, or optical filter of second or higher order transfer function which has the maximum flat delay characteristic.

With the optical filter of the first order transfer function, it is possible to suppress the random frequency shift without modification of the time waveform, since its amplitude and group delay characteristics both undergo gentle variations.

The optical filter of the second or higher order transfer function is roughly divided into a Butterworth type filter which implements the maximum flat amplitude characteristic and a Bessel type filter which implements the maximum flat delay characteristic. Since the Butterworth type filter is designed with a view to flattening the amplitude characteristic, the group delay characteristic greatly deviates from the "flatness" in the band, allowing modification of the lightwave pulse. Although its amplitude characteristic in the band is not always flat, the Bessel type filter does not cause modification of the lightwave pulse, since it is designed with a view to flattening the group delay characteristic in the band as much as possible; hence, it is possible to suppress the frequency shift without modifying the time waveform. A detailed description will be given later of the value of the full width at half maximum of the band of the band limited element relative to the full width at half maximum of the spectrum of the lightwave pulse or the curvature in the neighborhood of the center frequency.

BRIEF DESCRIPTION OF THE DRAWINGS

The present invention will be described in detail below with reference to accompanying drawings, in which:

FIG. 2 is a graph for explaining the effect of improving the transmission distance (bit error rate: $10^{-9}$) characteristic at a 20 Gb/s transmission rate when the curvature of the optical band-pass filter was set to an appropriate value so as to explain the effectiveness of Embodiment 1 of the present invention;

FIG. 3 is a graph for explaining the transmission distance-bit error rate characteristic at a 20 Gb/s transmission rate when the full width at half maximum (or curvature) of the band of the optical band-pass filter was set to an appropriate value so as to explain the effectiveness of Embodiment 1;

FIG. 4 is a block diagram illustrating the construction of Embodiment 2 of the present invention;

PREFERRED EMBODIMENTS OF THE INVENTION

[Embodiment 1]

Figure 1:
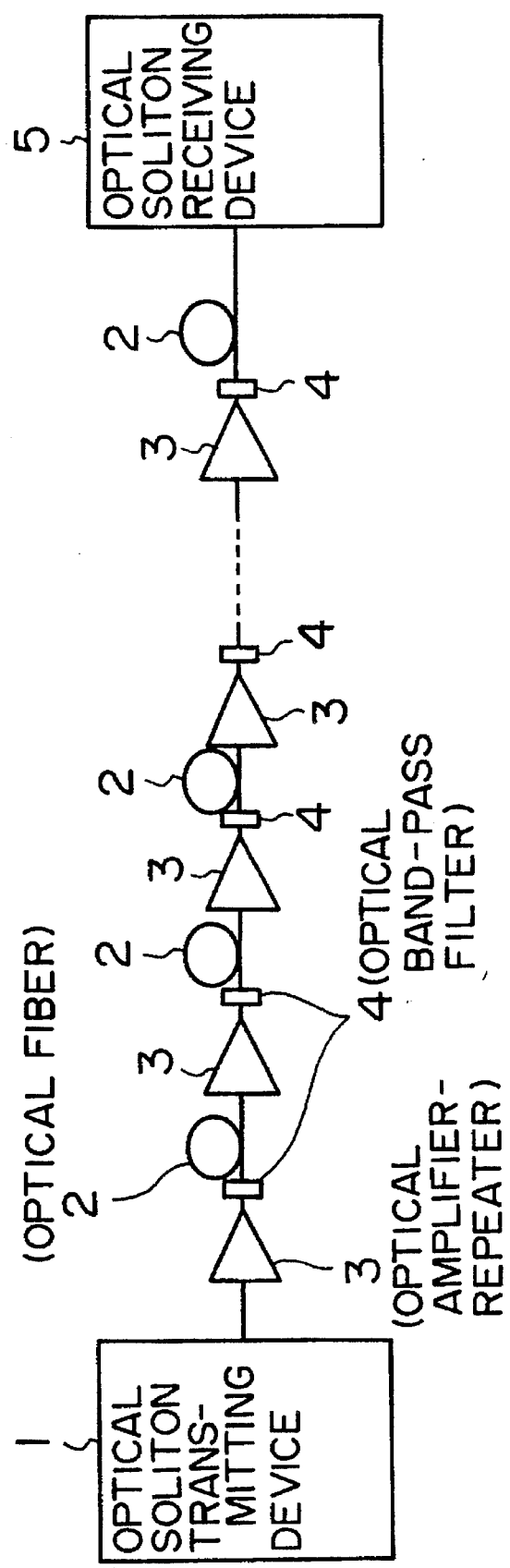
FIG. 1 is a block diagram illustrating the construction of Embodiment 1 of the present invention.

FIG. 1 illustrates a first embodiment of the present invention. Reference numeral 1 denotes a 20 Gb/s optical soliton transmitting device, 2 an optical fiber for transmission use, 3 an optical amplifier-repeater, 4 an optical band-pass filter, and 5 an optical soliton receiving device.

In the optical soliton transmitting device 1, output light of a DFB laser which CW-oscillates at a wavelength of 1558 nm is converted, by an InGaAsP electro-absorption type optical modulator subjected to a sine-wave modulation at 10 GHz, into a 10-GHz repetition-rate optical pulse train, which is branched into two routes; a 10 Gb/s data signal is superimposed on each of the branched signals by an optical modulator and the signal is time-division multiplexed in the light domain, thereby generating a 20 Gb/s pseudo-random optical signal. This embodiment uses, as the soliton pulse to be transmitted, a pulse whose full width at half maximum (t) of the time waveform is 11.5 ps and consequently 27.4 GHz in terms of the full width at half maximum ($B_{sof}$=0.315/t) of the soliton spectrum. The optical soliton transmitting device has means for changing the amplitude values of the two branched optical pulses, by which is generated a 20 Gb/s alternating-amplitude soliton signal (amplitude rate: 1 to 1.1) with amplitudes of adjacent soliton pulses changed alternately with each other.

The total length of the optical fiber for transmission is set to about 9000 km and the mean wavelength dispersion value D to 0.2 ps/km/nm. To compensate for losses by the optical fiber, there are installed 300 erbium-doped optical fiber amplifying repeaters at intervals of around 30 km.

The main line system of the optical amplifier is composed of an erbium-doped optical fiber, a WDM coupler and an optical isolator; a CW laser lightwave of a 1480 nm wavelength is applied as excitation light to the WDM coupler to back excite the erbium-doped optical fiber. The noise figure of each optical amplifier-repeater is 4.5 to 6.0 dB.

At the output stage of the erbium-doped optical fiber amplifier-repeater 3, there are provided 300 optical band-pass filters 4. The average optical output power of each optical amplifier-repeater is set to 0 dBm so that the average optical power for each repeater section satisfies the soliton condition. The optical output power of the optical amplifier-repeater needs only to be set in the range over which the soliton lightwave stably propagates (for example, ±3 dB which is a soliton lightwave output power). The optical band-pass filter 4 is a filter whose transfer function is approximately expressed by a first-order transfer function:

$$H(f)=1/(1+j2(f-f_0)/B) \qquad (1)$$

where $f_0$ is the center frequency of the filter and B its band-width. In this embodiment, the full width at half maximum of the intensity transfer function of the filter used is 6.9 nm which is about 31 times the full width at half maximum of the soliton spectrum.

The soliton lightwave receiving device 5 has a construction in which it branches a 20 Gb/s lightwave signal transmitted thereto into two signals, then demultiplexes each of them into a 10 Gb/s lightwave signal by an optical demultiplexer formed by an InGaAsP electro-absorption type optical modulator and converts it by a 10 Gb/s optical receiver into an electric signal. The optical demultiplexers are each driven by a synchronizing signal obtained by extracting a 20 GHz electrical clock component from the 20 Gb/s lightwave signal and demultiplexed or frequency divided down to 10 GHz and generate a rectangular optical gate waveform of a 50 ps duration and synchronized with the lightwave signal; the pulse train of either one of the two routes is selected.

Incidentally, to demonstrate the effectiveness of this embodiment, a 9000 km long optical transmission line portion was equivalently materialized by 100 recirculations of an optical fiber loop, which is composed of a 91 km long optical fiber and four optical amplifiers. The bit error rate after 9000 km transmission was of $1 \times 10^{-13}$; hence, an excellent transmission characteristic with a bit error rate of, say, $1 \times 10^{-12}$ or below, much in practice, could be attained.

To check on the permissible limits of the optical filter, tests were conducted with various full widths at half maximum of its band. Since the transfer function of the optical band-pass filter actually manufactured is not always expressed strictly by Eq. (1), the transmission characteristic was tested with the intensity transfer function of Eq. (1) Taylor-expanded around the center frequency $f_0$ as indicated below to change the curvature $a_1$ in the vicxinity of the center frequency.

$$|H(f)|^2 = 1 - a_1(f-f_0)^2 - a_2(f-f_0)^4 \qquad (2)$$

Moreover, the transmission characteristic for longer distances was evaluated by increasing the number of recirculations of the optical fiber loop. As a result, the bit error rate in 12000 km transmission was lower than $10^{-9}$ when the curvature of the optical filter was in the following range as shown in FIG. 2.

$$3.3 \times 10^{-6} \leq a_1 \leq 1.3 \times 10^{-5} \; (\text{GHz}^{-2}) \qquad (3)$$

The full width at half maximum of the light band, converted to a first-order optical band-pass filter, is $$4.4 \; \text{nm} \leq B \leq 8.8 \; \text{nm} \qquad (4)$$

This value is 40 to 20 times the full width at half maximum, $B_{sol}$, of the band of the soliton spectrum.

In FIG. 3 there are shown the results of tests on the bit error rate-distance dependency, using an optical filter which satisfies Eq. (3) or (4). As the result of this test, it was found that when the optical filter satisfying Eq. (4) was used, a practical bit error rate of lower than $1 \times 10^{-12}$ could be accomplished in the 9000 km transmission. Thus, the band of the first-order optical filter is wide and its permissible band width is appreciably large; it was found that the use of the first-order optical filter could permit sufficiently stable soliton communication, even taking into account the variation of its fabrication and the like.

The conventional frequency sliding type narrow-band filter has a curvature of around $3 \times 10^{-4}$ (GHz$^{-2}$) (value in terms of the full width at half maximum of the band:0.9 nm, about six times the full width at half maximum of the soliton band) (L. F. Mollenauer et al., Electronics Letters Vol. 29, No. 10, pp. 910–911, 13th May, 1993). The optical filter of this embodiment has a curvature more than $\frac{1}{10}$ that of the conventional optical filter and is sufficiently large in the full width at half maximum of the band, and hence is of great utility in practice.

With a typical prior art frequency guiding filter (an optical filter with the full width at half maximum about 10 times the soliton spectrum), the distance of transmission is limited to approximately 4500 km, from which it will be appreciated that the present invention is remarkably useful.

Furthermore, it was also found that as compared with the distance of transmission in the case of using the second-order Butterworth type filter having the maximum flat amplitude characteristic, the distance of transmission could be extended by 2000 to 3000 km by the use of the first-order optical filter even if it has the same curvature as that of the above-mentioned second-order filter. That is to say, it was proved that the use of the optical filter whose phase characteristic in the band bears substantially a linear phase is effective in improving the transmission characteristic.

This test was conducted on the soliton lightwave pulse of a 11.5 ps pulse width, that is, on the soliton lightwave pulse whose full width at half maximum of the optical spectrum $B_{sol}$ is 27.4 GHz; in a case of signals of different pulse widths, similar transmission characteristics could be obtained by holding the relative values of the square of the full width at half maximum of the soliton spectrum and the curvature of the optical filter as in this embodiment. Hence, by providing in the succeeding stage of each repeater a first-order optical band-pass filter which satisfies the following condition, it is possible to construct an optical transmission system which permits accurate transmission of information over 10000 km.

$$2.5 \times 10^{-3} \leq a_1 B_{sol}^2 \leq 1.0 \times 10^{-2} \qquad (5)$$

While this embodiment has been described to use the first-order optical band-pass filter as the optical band limited element, it is also possible to use second- or higher-order optical filters with the maximum flat delay characteristic (a Bessel type optical filter, for instance) since the time waveform of the soliton lightwave pulse is not deformed when the transfer function of the optical filter has the maximum flat delay characteristic. Furthermore, when the curvature near the center frequency satisfies Eq. (5), a wave-length multiplex transmission could be accomplished using a Fabry-p érot type filter whose intensity transfer function has a periodic frequency characteristic.

It is also evident that the same results as described above could be obtained by equivalently realizing the above-mentioned filter characteristic by lending frequency characteristics to optical parts which form the optical amplifier, such as the erbium-doped optical fiber, the WDM coupler, the optical isolator and the optical coupler, instead of directly using the optical filter.

This embodiment has been described as being applied to a system wherein the optical amplifier spacing is 30 km; the curvature of the intensity transfer function of the filter per unit length can be calculated by dividing Eq. (5) by $Z_{sol}/Z_{amp}=250 \; \text{km}/30 \; \text{km}=8.33$ through the use of the soliton period $Z_{sol}$ ($0.322 \times \pi^2 \times C \times t^2/(\lambda^2 \times D)$), where C is the light velocity in a vacuum, t is the full width at half maximum of the soliton time waveform (ps), $\lambda$ is the wavelength of light and D is the dispersion value of the optical fiber (ps/km/nm) which represents the unit distance of the soliton transmission. Accordingly, in an ordinary optical transmission system wherein the repeater spacing $Z_{amp}$ is not limited to 30 km, it is necessary only to use, in a 1.55 μm wavelength band, and optical filter which satisfies the following condition:

$$2.5\times10^{-3}\times Z_{amp}/Z_{sol}\times 8.33 \geq a_1 B_{sol}^2 \leq 1.0\times10^{-2}\times Z_{amp}/Z_{sol}\times 8.33 \quad (6)$$

that is, $$2.1\times10^{-2}\times Z_{amp}/Z_{sol} \leq a_1 S_{sol}^2 \leq 8.3\times10^{-2}\times Z_{amp}/Z_{sol} \quad (7)$$

In terms of the full width at half maximum of the band of the intensity transfer function of the optical filter, the above value corresponds to a value $7\times(Z_{sol}/Z_{amp})^{1/2}$ to $14\times(Z_{sol}/Z_{amp})^{1/2}$ times the full width at half maximum of the soliton spectrum.

While in this embodiment the optical amplifier and the optical filter are formed discretely, the same results as mentioned above could also be obtained by incorporating the optical filter in the optical amplifier, for instance. The optical amplifier could by formed, for example, by a module having the WDM coupler, the optical filter and the optical isolater formed as a unitary structure with one another.

Although this embodiment has been described to use the single-wavelength laser and the electro-absorption type optical modulator as short pulse light sources, it goes without saying that any soliton light sources such as a mode-locked laser and a gain switched laser can be employed. Besides, although the 20 Gb/s lightwave transmitting device has been described to be implemented by the optical time division multiplexing scheme, it may also be formed to directly transmit the 20 Gb/s lightwave signal instead without performing the optical time division multiplexing, or the 20 Gb/s lightwave signal may be generated by optical time division four-or eight-multiplexing.

Moreover, this embodiment has been described as being applied to the 20 Gb/s optical transmission system, but the long-distance, optical soliton transmission would be possible at higher transmission rates above several tens of gigabits per second.

[Embodiment 2]

FIG. 4 illustrates a second embodiment of the present invention. Reference numeral 1 denotes a 20 Gb/s soliton lightwave transmitting device, 2 an optical fiber for transmission use, 3 optical amplifying repeaters, 4 optical band-pass filters and 5 a soliton lightwave receiving device. This embodiment differs from Embodiment 1 in that the optical band-pass filters are each inserted for every three repeaters, not for each repeater.

The total length of the optical fiber 2 is set to about 9000 km and the average wavelength dispersion value to 0.2 ps/km/nm. To compensate for optical fiber losses, there are installed 300 erbium-doped optical fiber amplifying repeaters 3 at intervals of about 30 km. At the output stage of every third erbium-doped optical fiber amplifying repeater, there are provided 100 first-order optical band-pass filters 4. The pulses to be sent is the same as in Embodiment 1. The optical band-pass filters 4 are each a filter whose transfer function is approximately expressed by the first-order function, and the full width at half maximum of the band of the optical filter is 3.75 nm. The average optical light power of each optical amplifier-repeater is set to 0 dBm so that the average optical power for each repeater spacing satisfies the soliton conditions. This embodiment also achieved the $10^{-13}$ bit error rate in the 9000 km transmission.

Figure 5:
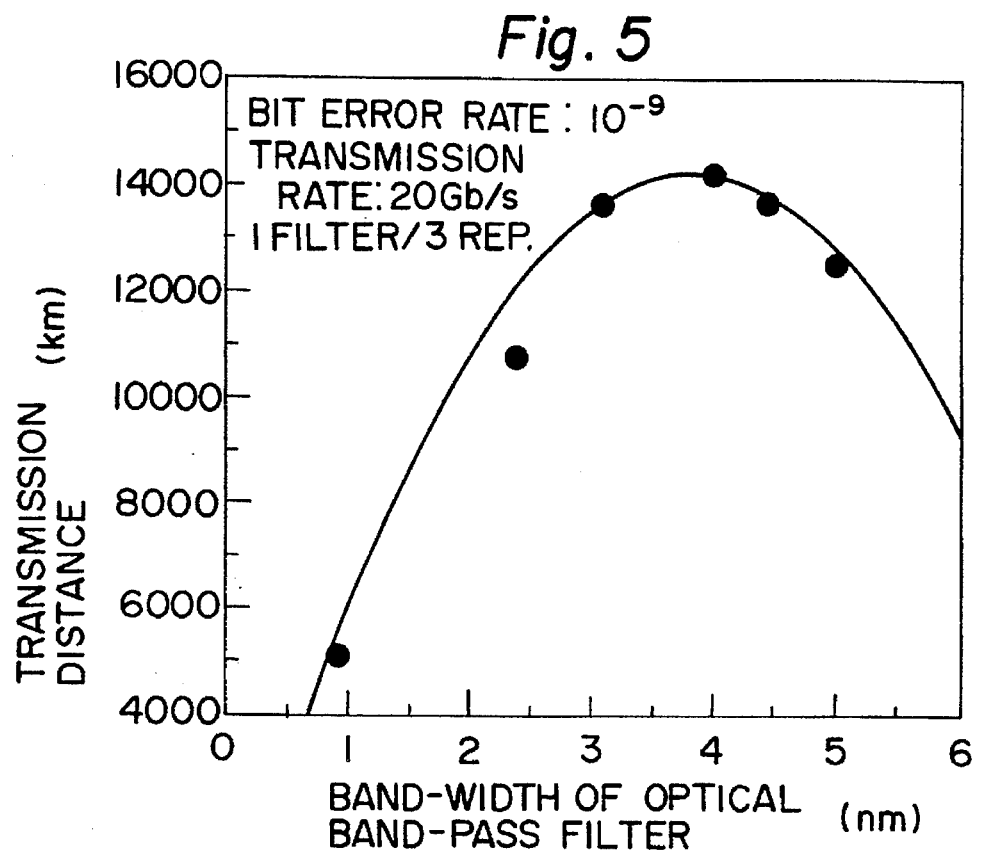
FIG. 5 is a graph for explaining the effect of improving the transmission distance (bit error rate: $10^{-9}$) characteristic at a 20 Gb/s transmission rate when the full width at half maximum of the band of a first-order optical band-pass filter according to Embodiment 2 of the present invention.
Figure 6:
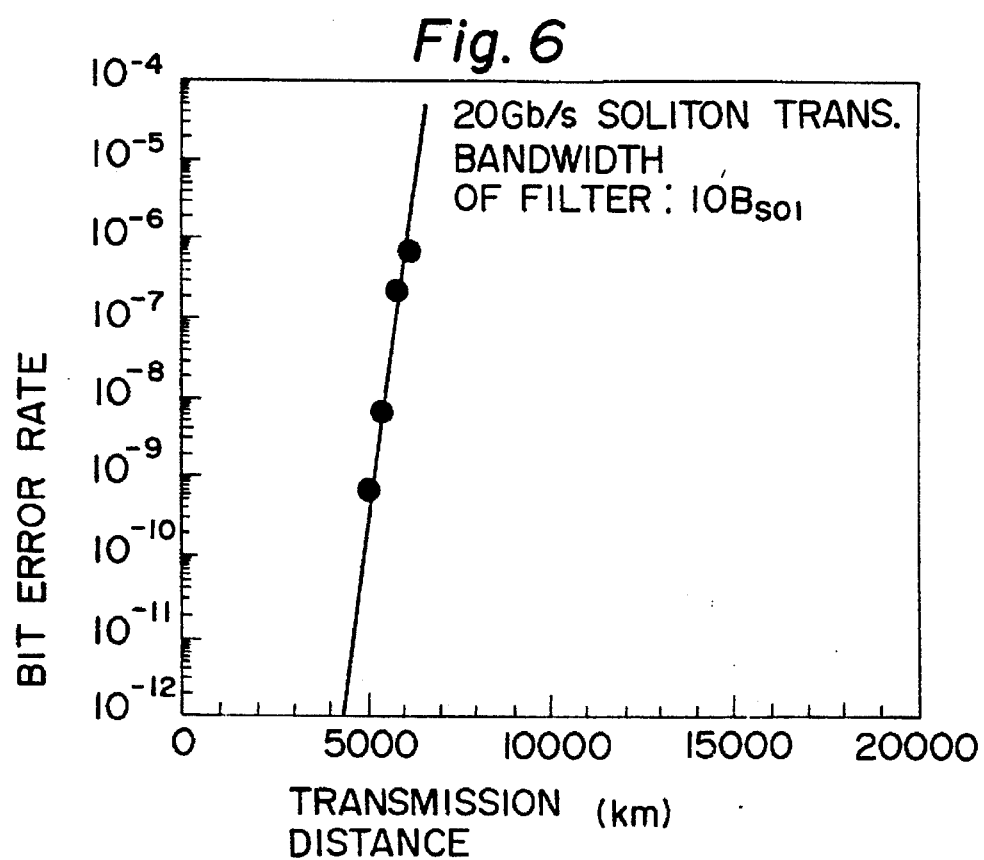
FIG. 6 is a graph showing a relationship between the bit error rate and the distance of transmission in a prior art example.

To demonstrate the effectiveness of this embodiment, the 9000 km long optical transmission line portion was equivalently realized by 100 recirculations of an optical fiber loop formed by a 91 km long optical fiber and four optical amplifier. FIG. 5 shows the relationship between the transmission distance (bit error rate $10^{-9}$) and the full width at half maximum of the band of the optical filter which was obtained in tests using different numbers of recirculations ans different full widths at half maximum of the band of the optical filter. The test results indicate that in the case of using one optical filter for every three repeaters, if its curvature falls in the range of the following value:

$$1\times10^{-5} \leq a_1 \leq 4\times10^{-5} \; (GHz^{-2}) \quad (8)$$

which corresponds to a value three times that of Eq. (3), that is, if the full width at half maximum is in the following range:

$$2.54 \; nm \leq B \leq 5.1 \; nm \quad (9)$$

a bit error rate of lower than $10^{-9}$ in 12000 km transmission or a bit error rate of lower than $10^{-12}$ in 9000 km transmission could be achieved. That is to say, by installing at the output stage of every third repeater an optical filter in which a value obtained by normalizing the full width at half maximum of the band of the filter by the full width at half maximum of the soliton spectrum falls inside of the following range:

$$20/(3)^{1/2}\text{--}40/(3)^{1/2} \quad (10)$$

or a first-order optical filter in which a value obtained by normalizing the curvature in the vicinity of the center frequency of the filter by $B_{sol}^2$ satisfies the following condition:

$$3\times 2.5\times10^{-3} \leq a_1 B_{sol}^2 \leq 3\times1\times10^{-2} \quad (11)$$

it is possible to construct an optical transmission system which achieves the satisfactory bit error rat of $1\times10^{-12}$ over more than 9000 km. In this embodiment, one optical filter is inserted for every three repeaters, and it is evident from Embodiments 1 and 2 that in the case of inserting one optical filter for every n (where $n \geq 2$) repeaters, and excellent transmission characteristic could be obtained by using an optical filter which provides substantially the same curvature of the intensity transfer function near the center frequency as the curvature of the overall intensity transfer function in the case of transmission over n repeaters with one optical filter inserted for each repeater.

Accordingly, in the case of inserting one optical filter for every n repeaters, if a value obtained by normalizing the full width at half maximum of the band of the optical filter by the full width at half maximum of the soliton spectrum is in the range of $$20/(n)^{1/2}\text{--}40/(n)^{1/2} \quad (12)$$

or if the curvature of the optical filter is in the range of $$n\times 2.5\times10^{-3} \leq a_1 B_{sol}^2 \leq n\times1\times10^{-2} \quad (13)$$

a bit error rate of lower than $10^{-12}$ could be obtained even in the case of 9000 km transmission. Since at least one optical filter needs to be provided within the soliton period representing the unit distance of the soliton transmission, the maximum value of n be an integer smaller than $Z_{sol}/Z_{amp}=$ 250 km/30 km=8.33; in this instance, the maximum value is 8.

When the repeater spacing is not 30 km, the same results as mentioned above could be obtained by setting the curvature of the intensity transfer function of each optical filter in the vicinity of the center frequency to a value in the following range:

$$n \times 2.1 \times 10^{-2} \times Z_{amp}/Z_{sol} \leq a_1 B_{sol}^2 \leq n \times 8.3 \times 10^{-2} \times Z_{amp}/Z_{sol} \quad (14)$$

In terms of the full width at half maximum of the band of the intensity transfer function of the optical filter, this value correspond to a value 7 $(Z_{sol}/Z_{amp})^{1/2}/(n)^{1/2}$ to 14 $(Z_{sol}/Z_{amp})^{1/2}/(n)^{1/2}$ times the full width at half maximum of the soliton spectrum.

In this embodiment, since the number of optical filters used is small, the influence of variation by fabrication can be lessened accordingly. In Embodiments 1 and 2, the optical filters are disposed several or n repeaters apart. It is preferable from the practical point of view that the optical filters be disposed separately, because the full width at half maximum of the band of the optical filter used becomes large in such a case; but from the viewpoint of transmission characteristic, they need not always be disposed regularly but may also be placed arbitrary positions so that at least one or more optical filters are contained in the soliton period which represent is the unit distance of soliton transmission. In such a case, since the soliton period is 250 km at maximum in Embodiments 1 and 2, the curvature of the product of intensity transfer functions of respective optical filters in the neighborhood of the center frequency needs only to be set to a value in the same range as in the case of the curvature of the product of intensity transfer functions in the soliton period in Embodiments 1 and 2, that is, in the range of:

$$2.1 \times 10^{-2} \leq a_1 B_{sol}^2 \leq 8.3 \times 10^{-2} \quad (15)$$

As described above in detail, according to the prior art, it is necessary that the narrow-band, sliging-frequency, guiding optical filter, which is very difficult to realize, be disposed in the transmission line for each repeater, or that a 2R repeater, which performs waveform shaping by a fast optical modulator, be disposed several repeating sections. According to the present invention, however, optical filters of a large full width at half maximum of the band which can easily be realized are inserted in the transmission line and the center frequency of the filter need not be changed with distance. This provides increased freedom of design and hence allows ease in the construction of a highly reliable, long-distance, high-capacity optical communication system.

What we claim is:

1. An optical transmission system, which is composed of an optical fiber for transmitting a lightwave with digital information loaded on return-to zero lightwave pulses and a plurality of optical amplifying repeaters disposed on the optical fiber at intervals of a distance $Z_{amp}$ to compensate for losses of the optical fiber, and in which a mean value of wavelength dispersion in a transmission line formed by the optical fiber and the optical amplifying repreaters and an output light intensity of each optical amplifying repeater are established such that a pulse compression effect by a non-linear optical effect on the lightwave pulses and a pulse expansion effect by the dispersion effect are mutually compensated for and in which, being provided $$Z = 0.322 \frac{\pi^2 C}{\lambda^2} \frac{\tau^2}{D}$$

(where D: mean value of wavelength dispersion of the optical fiber

λ: wavelength of the lightwave signal

C: light velocity in a vacuum

τ: full width at half maximum of a time-waveform of the lightwave signal)

at least one optical band limited element which has a flat group delay characteristic in the vicinity of a center frequency thereof is provided in the transmission line for each period Z, and a product, $aB_{sol}^2$, of a curvature a of a product of intensity transfer functions of the optical band limited element near the center frequency in the period Z and a square of the full width at half maximum, $B_{sol}$, of the spectrum of the lightwave pulses to be transmitted falls within a range of $2.1 \times 10^{-2}$ to $8.3 \times 10^{-2}$.

2. An optical transmission system, which is composed of an optical fiber for transmitting a lightwave signal with digital information loaded to return-to zero lightwave pulses and a plurality of optical amplifying repeaters disposed on the optical fiber at intervals of a distance $Z_{amp}$ to compensate for losses of the optical fiber, and in which a mean value of wavelength dispersion in a transmission line formed by the optical fiber and the optical amplifying repeaters and an output light intensity of each optical amplifying repeater are established such that a pulse compression effect by a non-linear optical effect on the lightwave pulses and a pulse expansion effect by said dispersion are mutually compensated for, and in which an optical band limited element which has a flat group delay characteristic in the vicinity of a center frequency thereof is disposed in the transmission line for each optical amplifying repeater and, being provided $$Z = 0.322 \frac{\pi^2 C}{\lambda^2} \frac{\tau^2}{D}$$

(where D: mean value of wavelength dispersion of the optical fiber

λ: wavelength of the lightwave signal

C: light velocity in a vacuum

τ: full width at half maximum of a time-waveform of the lightwave signal)

a product, $aB_{sol}^2$, of a curvature a of intensity transfer functions of the optical band limited element near the center frequency and a square of the full width at half maximum, $B_{sol}$, of the spectrum of the lightwave pulses to be transmitted is in the range of $2.1 \times Z_{amp}/Z \times 10^{-2}$ to $8.3 \times Z_{amp}/Z \times 10^{-2}$.

3. An optical transmission system, which is composed of an optical fiber for transmitting a lightwave signal with digital information loaded to return-to zero lightwave pulses and a plurality of optical amplifying repeaters disposed on the optical fiber at intervals of a distance $Z_{amp}$ to compensate for losses by the optical fiber, and in which a means value of wavelength dispersion in a transmission line formed by the optical fiber and the optical amplifying repeaters and an output light intensity of each optical amplifying repeater are established such that a pulse compression effect by a non-linear optical effect on the lightwave pulses and a pulse expansion effect by said dispersion are mutually compensated for and in which being provided $$Z = 0.322 \frac{\pi^2 C}{\lambda^2} \frac{\tau^2}{D}$$

(where D: mean value of wavelength dispersion of the optical fiber

λ: wavelength of the lightwave signal

C: light velocity in a vacuum

τ: full width at half maximum of a time-waveform of the lightwave signal)

an optical band limited element which has a flat group delay characteristic in the vicinity of a center frequency thereof is disposed in the transmission line for every n (n=2,3,4, ... an integer smaller than $Z/Z_{amp}$) optical amplifying repeaters and a product $aB_{sol}^2$, of a curvature a of intensity transfer functions of the optical band limited element near the center frequency and a square of the full width at half maximum, $B_{sol}$, of the spectrum of the lightwave pulses to be transmitted is in the range of $n \times 2.1 \times Z_{amp}/Z \times 10^{-2}$ to $n \times 8.3 \times Z_{amp}/Z \times 10^{-2}$.

4. An optical transmission system, which is composed of an optical fiber for transmitting a lightwave signal with digital information loaded to return-to zero lightwave pulses and a plurality of optical amplifying repeaters disposed on the optical fiber at intervals of a distance $Z_{amp}$ to compensate for losses of the optical fiber, and in which a mean value of wavelength dispersion in a transmission line formed by the optical fiber and the optical amplifying repeaters and an output light intensity of each optical amplifying repeater are established such that a pulse compression effect by a nonlinear optical effect on the lightwave pulses and a pulse expansion effect by said dispersion are mutually compensated for, and in which an optical band limited element having a first-order transfer function or a maximum flat delay characteristic is disposed in the transmission line for each optical amplifying repeater and, being provided $$Z = 0.322 \frac{\pi^2 C}{\lambda^2} \frac{\tau^2}{D}$$

(where D: mean value of wavelength dispersion of the optical fiber

λ: wavelength of the lightwave signal

C: light velocity in a vacuum

τ: full width at half maximum of a time-waveform of the lightwave signal)

the full width at half maximum of a band of the intensity transfer function of the optical band limited element is in a range of values $7 \times (Z/Z_{amp})^{1/2}$ to $14 \times (Z/Z_{amp})^{1/2}$ times the full width at half maximum of the spectrum of the lightwave pulse.

5. An optical transmission system, which is composed of an optical fiber for transmitting lightwave signal with digital information loaded to return-to zero lightwave pulses and a plurality of optical amplifying repeaters disposed on the optical fiber at intervals of a distance $Z_{amp}$ to compensate for losses of the optical fiber, and in which a mean value of wavelength dispersion in a transmission line formed by the optical fiber and the optical amplifying repeaters and an output light intensity of each optical amplifying repeater are established such that the pulse compression effect by the nonlinear optical effect on the lightwave pulses and the pulse expansion effect by said dispersion are mutually compensated for and in which, being provided $$Z = 0.322 \frac{\pi^2 C}{\lambda^2} \frac{\tau^2}{D}$$

(where D: mean value of wavelength dispersion of the optical fiber

λ: wavelength of the lightwave signal

C: light velocity in a vacuum

τ: full width at half maximum of a time-waveform of the lightwave signal)

an optical band limited element which has a first-order transfer function of a maximum flat delay characteristic is disposed in the transmission line for every n (n=2,3,4, ... an integer smaller than $Z/Z_{amp}$) optical amplifying repeaters and the full width at half maximum of a frequency band of the optical band limited element is in a range of values $7 \times (Z/Z_{amp})^{1/2}/(n)^{1/2}$ to $14 \times (Z/Z_{amp})^{1/2}/(n)^{1/2}$ times the full width at half maximum of the spectrum of the soliton pulse.

6. An optical transmission system as in one of claims 1–5, further comprising an optical transmitting device for transmitting the lightwave signal on the transmission line and an optical receiving device for receiving the lightwave signal transmitted on the transmission line.

* * * * *